: 2,905,659
Patented Sept. 22, 1959

2,905,659

METHOD OF REMOVING HEAVY METAL CATALYST FROM OLEFINIC POLYMERS BY TREATMENT WITH DE-GASSED WATER

Floyd F. Miller, Wadsworth, and David S. Conner, Avon Lake, Ohio, assignors to Goodrich-Gulf Chemicals, Inc., Cleveland, Ohio, a corporation of Delaware No Drawing. Application August 7, 1956
Serial No. 602,491

8 Claims. (Cl. 260—85.3)

The present invention relates to the treatment of reaction mixtures obtained from the polymerization of olefinic hydrocarbons in the presence of certain heavy metal organometallic catalysts. More specifically the invention relates to a method of inactivating and extracting such heavy metal containing catalysts to produce undegraded polymers substantially free of inorganic residues.

In the polymerization of 1-olefinic hydrocarbons with certain heavy metal organometallic catalysts the final reaction mixture consists of a solution, or slurry of solid polymer, in solvent heavily contaminated with active catalyst and its residues. These catalysts are extremely sensitive to oxygen, in fact some of them are highly pyrophoric and will spontaneously smoke or burst into flame in air. Oxidation converts the catalyst to highly insoluble products, believed to be metallic oxides, which are most difficult to remove from the polymer. Unless removed they degrade the polymer and render it strongly colored when heated. Consequently, it is imperative that the catalyst be at least rendered inactive to oxygen before the polymerization reaction mixture is exposed to air. For efficient extraction, the catalyst and its residues must also be solubilized. Up to the present alcohols and amines have been used to inactivate the catalyst. Such catalyst killers or "shortstops," however, are expensive and difficult to handle under commercial operating conditions. Moreover, the alcohols react with the catalyst to produce a product that is a powerful polymer degradation catalyst. Many of the amines form reaction products with the catalyst, which if left in the polymer have deleterious effects on the vulcanization reaction and on vulcanized polymer properties. The use of alcohols and amines usually require an all-organic type of procedure for efficient catalyst extraction since the presence of water seems to form sludges and otherwise render polymer work-up more difficult.

In accordance with the present invention, however, it has been found that water does not interfere with catalyst extraction, and in fact water is in itself a most efficient catalyst killer and extractant, if the water utilized is substantially free of dissolved oxygen. Freshly-distilled water substantialy free of dissolved oxygen reacts readily with the catalysts converting the latter to soluble products which are substantially quantitatively extracted from the solvent. Reaction mixtures treated with oxygen-free water are immediately decolorized and after one or two additional extractions with deoxygenated water are substantially free of inorganic residues. This method is especially effective in the treatment of reaction mixtures in which the polymer is present in the dissolved form. With the latter, contact between the water and the water-immiscible polymer solution is much better than that, for example, between water and the hydrophobic solid hydrocarbon polymers. As a consequence, extraction of inorganic catalyst residues is much more effective.

It had been formerly thought that water was a bad actor in this style of polymerization and that it converted the catalyst to insoluble residues. However, it was found that it was the usual dissolved oxygen content of water that produces the observed precipitates.

The treatment with water should thus be carried out in the absence of substantial amounts of oxygen. This is most conveniently carried out by maintaining an inert atmosphere such as hydrocarbon vapors, nitrogen, argon or helium over the reacting materials until the catalyst has been inactivated and extracted. After the water layer is removed the polymer solution can be exposed to air. The water extract obtained, however, is strikingly sensitive to oxygen. Originally deeply colored, on contact with air the water extract loses its color and a heavy white precipitate begins to form and settle out.

It is difficult to place an absolute limit on the concentration of oxygen that can be tolerated during the water catalyst killing and extraction steps. In the first place only electrical grade polymers require quantitative extraction of catalys residue and small amounts (i.e. about 0.1 to 0.2 percent ash) can be tolerated in other cases. Secondly, it appears that the total amount of oxygen has an effect similar to that of concentration. The effects of total oxygen content show up in commercial scale operations where less efficient agitation requires larger volumes of water for efficient extraction. Where larger volumes of water are utilized the total amount of oxygen can exceed the precipitation level, even though the concentration is low. Thirdly, since the degassing of water to very low oxygen levels is a quite expensive operation, economical commercial operations dictate the use of water with as high an oxygen content as can be tolerated. However, it is known that a simple operation of heating water to boiling or near boiling and then cooling under nitrogen provides water of a sufficiently low oxygen content to completely avoid precipitation. It is also known that a hydrocarbon solution of trialkyl aluminum/$TiCl_4$ type catalyst can be steam distilled without precipitation (in the latter case the initial vaporization of water seems to free the system, the unvaporized water and the steam subsequently generated therefrom of practically all of its oxygen content). Generally, if the water contains less than about 20 percent of the oxygen that it can carry at 25° C., precipitation will be maintained within satisfactory limits over quite a large range of water to catalyst ratios.

The catalysts which are effectively inactivated and extracted by the method of this invention are most fully described in the copending application of Karl Ziegler et al., Serial No. 469,059, filed November 15, 1954, and that of Carlin F. Gibbs et al., Serial No. 503,027, filed April 21, 1955. Such catalysts contain organometallic groups wherein a hydrocarbon radical is attached to a metal atom and they also contain a heavy metal of the 4th to 10th positions of the long periods of the periodic arrangement of elements in short and long periods (such as is shown on page 342, Handbook of Chemistry and Physics, 33d edition, published by Chemical Rubber Publishing Co., Cleveland, Ohio, 1952). Thus, they are made up of metal atoms connected to radicals capable of joining to metal atoms in organometallic compounds, at least one of such radicals being an organic radical connected to a metal atom through a carbon atom, and at least one of the metal atoms being a heavy metal of the class described. In this definition of the catalyst the term "radicals capable of joining to metal atoms in organometallic compounds" includes (1) organic radicals capable of linking to metal through carbon such as alkyl radicals, aryl radicals, cycloalkyl radicals, and other hydrocarbon radicals, (2) oxy-hydrocarbon radicals such as alkoxy radicals, aroxy radicals, etc., (3) organic salt-forming radicals such as the acetyl-acetone radical, the oxalate radical, etc., (4) inorganic salt-forming radicals such as the halogen atom (that is fluorine, chlorine, bromine and iodine) as well as oxyhalide radicals, sulfate radicals, and others, and (5) hydrogen atoms. The term "heavy metal of the 4th to 10th positions of the long periods of the periodic arrangement of elements, etc." includes the metals of groups IV–B, V–B, VI–B, VII–B and VIII including titanium, zirconium, hafnium, vanadium, niobium, (columbium), tantalum, chromium, molybdenum, tungsten, manganese, technetium, rhenium, iron, cobalt, nickel, ruthenium, rhodium, palladium, osmium, iridium, and platinum as well as metals in the corresponding positions in the last long period in the so-called "actinum series" such as thorium and uranium.

The above definition includes catalysts which are made up of a single organometallic compound having as its metallic portion a heavy metal atom of the group set forth, with or without other metals, and it also includes catalysts made by reacting a plurality of chemical compounds, one of which may be an organometallic compound in which a carbon atom of an organic group is attached to a metal atom other than a heavy metal atom, for example, an alkali metal (Na, K, or Li), an alkaline earth metal (Ba, Ca, Sr, Mg), aluminum, zinc, tin, a rare earth metal, lead, or some other metal, and another of which is a simple compound of a heavy metal of the class described, the two types of compounds each having the metal atoms connected only to radicals of the type set forth above.

Preferred catalysts, both because of their greater utility and because of their wide applicability in the polymerization of olefinic hydrocarbon monomers are those prepared by reacting (1) an "alkyl donor" substance such as those selected from the class consisting of alkyl aluminum and alkyl tin compounds and (2) a titanium or vanadium tetrahalide. Catalysts prepared from a trialkyl aluminum compound and titanium tetrachloride or vanadium tetrachloride, for example, are precipitate-containing materials having pronounced ability to directively polymerize butadiene-1,3 hydrocarbons such as isoprene, butadiene, etc. to an all-1,4 structure. Others of this class, for example a dialkyl aluminum halide such as diethyl aluminum bromide or diisobutyl aluminum chloride, and titanium tetrachloride, react to form soluble catalysts having the ability to produce fluid, high solid slurries of polyethylene.

The monomeric materials which are utilized in producing the reaction mixtures treated according to this method are 1-olefinic hydrocarbons (as distinguished from 2-olefinic, etc.). Illustrative monomers of this type include monoolefins such as ethylene, propylene, 1-butene, isobutylene, 1-pentene, 1-hexene, 1-octene, 1-decene, styrene, vinyl naphthalene, and others; polyolefins including the conjugated dienes such as butadiene-1,3, isoprene, piperylene, 2,3-dimethyl-butadiene-1,3, 2-ethyl-pentadiene-1,3, 2-isopropyl-butadiene-1,3, 2-neopentyl-butadiene-1,3, myrcene, alloocimine, and others; the conjugated alicyclic polyolefinic hydrocarbons such as cyclopentadiene-1,3, cyclohexadiene-1,3, cycloheptadiene-1,3, dimethyl fulvene, and others; the aryl-substituted diolefins such as 2-phenyl-butadiene-1,3, 2,3-diphenyl-butadiene-1,3, diphenyl fulvene, and others; and mixtures of one or more of these monoolefins and/or polyolefins with or without non-conjugated polyolefins such as allene, diallyl dimethallyl, propyl allene, squalene, 1-vinyl-cyclohexene-3, divinyl benzene, and others.

The method of this invention is believed to be of greatest significance in treating reaction mixtures containing soluble polymers, and especially those soluble polymers containing unsaturation. Contact between the water and a dissolved polymer is usually better than that obtained with hydrophobic solid hydrocarbon polymers. Most monoolefinic monomers, except ethylene and to a certain extent propylene and styrene, can be polymerized with the preferred catalysts to high molecular weight polymers and copolymers which are soluble in the polymerization solvent and are usually obtained as thick cement-like solutions. The conjugated diolefin hydrocarbons usually polymerize in this system to produce soluble, unsaturated polymers and copolymers which, for best properties, must be isolated therefrom in an ungelled, undegraded condition. Active catalysts and their residues have the tendency in the presence of oxygen to increase gel content and reduce the molecular weight of the soluble portion of the polymer. Alcohol-catalyst reaction products degrade the diene polymers at a rapid rate, even in the absence of oxygen. The water catalyst-shortstop and extractant of this invention completely solubilizes the catalyst and is immediately separated therefrom as an immiscible layer so that degradation of polymer is minimized, especially of the unsaturated diolefin polymers and copolymers.

The polymerization reaction to produce a reaction mixture of the type to be treated by the method of this invention can be carried out in a closed vessel by first forming a solution and/or suspension of the catalyst in an inert hydrocarbon solvent and then adding the monomeric material while the reaction mixture is cooled to maintain the temperature below about 80° C., preferably between about −30 and about 80° C., and most preferably between about −20 and about 60° C. Significant amounts of oxygen, water, and active hydrogen containing materials, sulfur, and other catalyst poisons should be carefully excluded from the mixture (in some cases catalyst proportions can be increased to compensate) during polymerization by using purified, dry and deaerated monomers and solvents and maintaining in inert atmosphere such as nitrogen, argon, helium or hydrocarbon vapors over the reaction mixture. The reaction pressure is not critical, pressures above or below atmospheric pressure can be utilized, the pressure due to the vapor pressures of monomers and solvents alone being satisfactory in most cases. Gaseous monomers can be introduced below the surface of the catalyst solution while liquid monomers can be introduced as such. Under these conditions the monomers polymerize to form a solution or dispersion (slurry), or both, of polymer in the solvent. If a polymer solution is formed, an increase in viscosity is readily apparent. If the polymer precipitates out as a slurry, the reaction can sometimes be carried to higher total solids. The reaction usually is rapid and is accompanied by the evolution of heat.

The relative proportions of solvent, catalyst and monomers employed in the above-described polymerization process may be varied considerably, although for the purposes of this invention the proportion of solvent preferably should be selected so as to yield a more or less fluid polymer solution or slurry in order to facilitate contact with the deoxygenated water. While a solid mass or very thick slurry or cement of the polymer can be mechanically worked with water, extraction is inefficient as compared to that obtainable with a more fluid reaction mixture. It is ordinarily desirable, therefore, to employ an amount of solvent in excess of the monomeric material, usually between about 1 and about 30 times by volume that of the monomer, and preferably between about 5 and about 20 times the monomer charge. Where a gaseous monomer is bubbled through a catalyst solution, the ratio solvent:monomer will, of course, be very great at all times. Polymer solutions usually get quite thick at about 6 to 10 percent solids content while with the slurry-like product quite fluid slurries of up to 30 to 40 percent or more solids content can sometimes be obtained.

Any inert solvent or diluent can be utilized. Inert hydrocarbons are best including the aliphatic, cycloaliphatic and aromatic hydrocarbons such as propane, butane, pentane, hexane, heptane, decane, and higher aliphatic hydrocarbons including mixtures of these and others such as mineral oil, "Deobase" kerosine, Fischer-Tropsch hydrocarbons, diesel oil, and many others; the monomers themselves such as ethylene, propylene, 1-butene, isobutylene, diisobutylene, 1-pentene, 1-octene, styrene, isoprene, and many others; cycloaliphatic hydrocarbons such as cyclohexane, cycloheptane, and others; and aromatic hydrocarbons such as benzene, xylene, toluene and others.

The amount of catalyst likewise can be varied widely depending on the particular catalyst itself, on the monomer or monomers, on the solvent, and on the purity of all ingredients present. For the conjugated diolefins such as isoprene and butadiene, however, from 0.5 to 20 percent by weight, preferably from about 1 to about 5 percent, based on the weight of monomer will usually be sufficient. For ethylene, 1-pentene and other 1-monoolefins, smaller amounts measured in millimoles (mM) per liter of solvent, for example from 1 to 300 mM/liter can be employed. For styrene up to 800 mM/liter may be employed. For the preferred alkyl aluminum:titanium tetrachloride catalysts the molar ratio Ti/Al or Va/Al can be varied from as high as 10:1 or slightly higher to as low as 1:10, or lower, depending on the choice of monomer system, solvent, etc. For directive polymerization of isoprene or butadiene to an all-1,4 type polymer the catalyst molar ratio may vary from about 2:1 to about 1:2. For all cis-1,4 polyisoprene this ratio should be at or near 1:1. For the preparation of an all trans-1,4 polybutadiene the ratio should be at or near 2:1. For polyethylene, the ratio may be varied more widely depending on the molecular weight desired in the polymer, for example, from 3:1 to 1:10.

The amount of water to be added in the catalyst-destroying step should at least be sufficient to react with all the catalyst present. In addition, there preferably should be sufficient water present to dissolve the catalyst-water reaction products and carry them away as an easily separable aqueous phase. However, very small proportions of water of only about 1/100 to 1/10 the volume of the reaction mixture can perform both of these functions very efficiently. Larger volumes can be utilized, and in many cases may be desirable. In the extraction or final washing procedures larger volumes preferably should be utilized, even up to equal or double volumes. In any case agitation should be as efficient as possible to insure good contact, especially when utilizing small proportions of water.

As pointed out above, following the destruction of the catalyst by the first addition of water low in oxygen, the reaction mixture is preferably treated with at least one additional portion of fresh water. When efficiently done, the water added to destroy the catalyst also quantitatively extracts the reaction products. However, droplets of aqueous catalyst/water reaction products remain adhering to the vessel walls and/or suspended in the solvent, and it is necessary to wash these out to avoid polymer contamination. Two extraction procedures usually will remove essentially 100 percent of the catalyst residue, as will be clearly demonstrated by catalyst weight balances in the examples below.

After catalyst extraction is complete the reaction mixture is filtered (if a slurry) or coagulated (if a solution) to isolate the pure polymer therefrom and the latter is then dried. Coagulation of hydrocarbon solutions of polyisoprene or polybutadiene, for example, can be accomplished by adding alcohol thereto, by adding the polymer solution to alcohol or to solvent/alcohol mixtures, or by distilling or evaporating the solvent. Several of these procedures are more fully described in our copending applications, Serial Nos. 602,490, 602,492, 602,493 and 602,495, filed herewith.

The invention will now be more fully described in several specific examples which are intended to be illustrative only.

*Example I*

440 grams (500 ml.) dry benzene (topped 10 percent) is placed in a freshly dried 1000 ml. separatory funnel and the latter is flushed out with dry, $O_2$-free nitrogen and then sealed. There is then added by hypodermic syringe 1.0 ml. of triisobutyl aluminum and 0.38 ml. of $TiCl_4$. Upon addition of the latter the flask is shaken to effect mixing. The color of the benzene turns dark and a dark, reddish-brown precipitate soon settles out. 5 ml. of freshly distilled water taken warm directly from the condenser of a laboratory still is then added to the flask and the latter is vigorously shaken. The brown color rapidly disappears and the brown precipitate dissolves completely. The flask contents become colorless. On continued shaking a blue color develops in the water layer which settles out each time the flask is allowed to stand. The water layer is then drained off through the bottom opening. On striking the air the blue color of the water disappears and a white, flaky precipitate begins to form on the surface of the water. After standing in air for some time the water layer is converted to a pasty mass. Blue droplets are noted adhering to the interior wall of the flask in the region of the benzene layer.

When the above procedure is repeated on an identical catalyst solution and the benzene layer is subsequently twice extracted with 50 ml. portions of freshly-distilled warm water, the blue droplets in the flask disappear. The twice-extracted benzene layer is water white and when evaporated to dryness no solid residue remains showing that extraction of the catalyst is quantitative. When portions of the three aqueous extracting layers are evaporated to dryness, the following weights of solids are obtained:

|  | Grams |
|---|---|
| #1 (Catalyst killing portion) | 1.218 |
| #2 (First extract) | 0.098 |
| #3 (Second extract) | 0.005 |

Portions of the benzene layer (20 ml.) removed after each water addition and then evaporated to dryness show the following residue contents:

|  | Grams |
|---|---|
| After catalyst kill | 0.0003 |
| After first extract | 0.0000 |
| After second extract | 0.0000 |

It is evident that the water added in the catalyst killing step substantially quantitatively extracted the catalyst.

*Example II*

In this example distilled water is boiled to thoroughly de-gas it and it is then cooled and stored under dry nitrogen. A catalyst identical to that of Example I is utilized to polymerize isoprene to an essentially all cis-1,4 polyisoprene. The reaction is conducted at 5° C. in a glass 1-quart carbonated soft drink bottle under a dry nitrogen atmosphere. Sufficient isoprene (about 59 ml.) is added to about 500 ml. of catalyst solution to produce a final cement of 6–8 percent total solids content. The product is slightly over one-half liter of a very viscous, dark brown cement. The latter is drained through tubing into a liter of the degassed water contained in a nitrogen-filled resin reaction vessel fitted with a laboratory stirrer. After agitating for 10 minutes or more and allowing to stand for about 10 minutes a very dark blue aqueous extract layer has collected in the bottom of the flask. The latter is drawn off and is found to measure 980 ml. and to have a pH of 3.6. A second portion of de-gassed water (500 ml.) is then added while agitating the mix. The stirrer is shut off as soon as the water is all in. After standing for awhile 485 ml. of a pale blue extract layer (pH 3.6) is withdrawn. A second 500 ml. of de-gassed water is added, agitated and then allowed to settle. The water layer which separates is colorless, measures 490 ml. in volume and has a pH of 4.1. A final 500 ml. of water are then added, the mix agitated and again allowed to stand until good separation occurs. The extract layer withdrawn from this last extraction is colorless, measures 530 ml. and has a pH of 4.6. The benzene cement layer remaining in the flask at this point is clear and colorless. An antioxidant (0.18 gram of "Agerite White") is added thereto and the benzene cement exposed to the air while being poured into a solution of 3 volumes of benzene and 1 volume of methanol, methanol being added meanwhile to maintain the 3:1 ratio. A fine, easily-handled crumb is obtained which is filtered, washed with pure methanol and dried. The polymer is essentially free of gel and has an I.V. of 3.0 indicating that little, if any, polymer degradation occurred during the aqueous catalyst killing and extraction procedure.

Total solids are determined on each of the four water extract layers obtained above to determine the relative amounts of catalyst residue removed at each water treatment step. The data are as follows:

| Step No. | Vol. H₂O added, ml. | Vol. H₂O drained, ml. | Percent of total residue removed |
|---|---|---|---|
| 1 | 1,000 | 980 | 91.6 |
| 2 | 500 | 485 | 3.9 |
| 3 | 500 | 490 | 3.4 |
| 4 | 500 | 530 | 1.1 |
| Total | | | 100.0 |

As will be seen with better contact and separation only three steps are required for complete extraction.

*Example III*

The procedure of Example II is repeated allowing longer agitation times and slightly longer separation times. The data are as follows:

| Step No. | Vol. H₂O added, ml. | Vol. H₂O drained, ml. | Percent of total residue removed |
|---|---|---|---|
| 1 | 1,000 | 915 | 92.5 |
| 2 | 500 | 480 | 6.8 |
| 3 | 500 | 585 | 0.7 |
| Total | | | 100.0 |

As will be seen with better contact and separation only three steps are required for complete extraction.

*Example IV*

The effect of agitation time is studied further by adding a bottle (500 ml.) of polyisoprene cement (similar to that of the preceding example) to a reaction vessel similar to that described in Example II and then adding about 1000 ml. of de-gassed water prepared as described in Example II. Samples of extract layer are drawn off at periods during the agitation step, the periods ranging from 9 minutes to 68 minutes. The total weight of catalyst residue extracted in each period is then determined on each such sample. The data are as follows:

| Time of agitation, minutes | Weight of catalyst residue, grams |
|---|---|
| 9 | 0.975 |
| 14 | 1.35 |
| 19 | 1.47 |
| 29 | 1.53 |
| 61 | 1.51 |

Apparently, with the laboratory bench style equipment employed about 20 minutes agitation will extract the maximum amount of residue. The clear water white cements obtained in this one step procedure with 20 minutes or more agitation are air-dried to obtain solid polymers. Their ash contents are only 0.06 to 0.08 percent.

*Example V*

As mentioned hereinabove water-soluble complexing or metal chelating agents can be added to the de-gassed water used to kill the catalyst or extract the polyisoprene cement. A small olequot of a cement similar to those of the previous examples is run into a small glass-stoppered sample bottle filled with dry, O₂-free nitrogen. A calculated volume (based on catalyst content) of a saturated solution of tartaric acid in freshly distilled water is added thereto and the bottle is shaken vigorously. The brown color of the cement is completely discharged and no trace of a precipitate can be observed. Concentrated aqueous NH₄OH is then added to a pH above 7. No precipitate forms even when the pH is raised to as high as 11 or 12. The ammoniacal extract layer is then exposed to air without formation of a precipitate. Without the tartaric acid the addition of ammonia to an aqueous catalyst extract produces a precipitate even before exposure to air. The above procedure produces a substantially neutral polymer solution essentially free of inorganic residue.

*Example VI*

A slurry of high molecular weight, highly crystalline polyethylene is prepared by polymerization in benzene, hexane, or heptane using 11 millimoles per liter of solvent of hydride-free diisobutyl aluminum chloride and 5.5 millimoles per liter of titanium tetrachloride. The catalyst is prepared by mixing the catalyst forming ingredients in 50 percent of the benzene, aging for 30 minutes at room temperature, then adding the remainder of the benzene. Such a solution is substantially clear and does not contain a visible precipitate. Ethylene is bubbled through the agitated catalyst solution at such a rate as to give zero exhaust. Starting at room temperature, the temperature gradually rises and is controlled at 50° C. Reaction slurries prepared in this way are quite fluid when they contain as high as 350 grams/liter or more of polyethylene. De-gassed water, in equal volume, is mixed with the slurry under nitrogen atmosphere. Catalyst extraction from the solvent is quite complete but the polymer discolors quite badly when molded, indicating that water does not have good contact with the hydrophobic polymer. The latter deficiency is overcome to a considerable extent when non-ionic surface active agents or methanol are added to the extraction water.

*Example VII*

Pentene-1, octene-1, and mixtures of each of these with isoprene polymerize in benzene using as a catalyst the dark, precipitate-containing catalyst prepared by reacting triisobutyl aluminum and titanium tetrachloride. The resulting polymers are rubbery, completely soluble materials obtained as viscous solutions in benzene. De-gassed water added to the reaction mixtures quantitatively kills and extracts the catalyst and its residue in the manner described in Examples I to IV. The cement-like benzene solution is rendered colorless by this treatment. The polymer is then precipitated with methanol, age-resisters added and the crumb-like polymer is dried. Those containing isoprene vulcanize to form excellent air barrier layers due to their low permeability to air.

*Example VIII*

The procedure of Examples I to IV is repeated wherein 401 grams of polyisoprene cement (6.8 percent T.S.) is added to 1000 ml. of de-gassed water which has been warmed to 40 to 50° C. The cement-like reaction mixture is rapidly decolorized and is noticeably less viscous than at room temperature. When allowed to stand a very dark blue aqueous layer collected in the bottom of the flask. Two additional extractions with 500 ml. portions of warm water produce a water white benzene layer having a very low inorganic residue content. It is desirable to have benzene-soluble antioxidants present during this higher temperature extraction procedure.

We claim:
1. The method of treating a reaction mixture prepared by polymerization of a 1-olefinic hydrocarbon monomer in the presence of an organometallic catalyst containing hydrocarbon radicals bound to metal atoms through carbon atoms and in which at least one metal atom is a metal of the 4 to 10th positions of the periodic arrangement of elements in short and long periods, which method comprises treating said reaction mixture, while under an inert atmosphere, with de-gassed water and then separating said polymer from said water.

2. The method of treating a reaction mixture comprising a solution of polymer prepared by polymerization of a polyolefinic hydrocarbon containing conjugated double bonds in an inert hydrocarbon solvent containing a catalyst prepared by the reaction of (1) an organometallic alkyl donor substance selected from the class consisting of alkyl aluminum and alkyl tin compounds and (2) a compound selected from the class consisting of titanium and vanadium tetrahalides, which method comprises treating said reaction mixture under an inert atmosphere with de-gassed water and separating said polymer solution from said water.

3. The method as defined in claim 2 wherein the said polymer solution separated from said water is extracted with additional portions of said de-gassed water until said polymer solution is substantially free of inorganic residue.

4. The method of treating a reaction mixture comprising a solution of polymerized diene hydrocarbon prepared by the polymerization of an open-chain aliphatic conjugated diene in a hydrocarbon solvent in the presence of a catalyst made by reacting (a) a trialkyl aluminum with (b) titanium tetrachloride, which method comprises mixing said reaction mixture with sufficient water, amounting to at least $\frac{1}{100}$ of the volume of said reaction mixture, to react with said catalyst and its residues and form a separable aqueous extract layer, said mixing being carried out under an inert atmosphere and said water being substantially free of dissolved oxygen, and separating said extract layer from the remainder of said reaction mixture.

5. The method of claim 4 wherein the said remainder of said reaction mixture is extracted with substantially oxygen-free water until the said solution of polymerized diene hydrocarbon is substantially free of inorganic residue.

6. The method of treating a reaction mixture comprising a solution of polyisoprene in a hydrocarbon solvent prepared by the polymerization of isoprene in the presence of a catalyst made by reacting a trialkyl aluminum with titanium tetrachloride, which method comprises mixing said reaction mixture with sufficient de-gassed water, amounting to at least $\frac{1}{100}$ of the volume of said reaction mixture, to react with the said catalyst and its residues and form a separable aqueous extract layer, said mixing being carried out under an inert atmosphere, separating said extract layer from the remainder of said reaction mixture, and washing the said remainder of said reaction mixture with additional portions of said de-gassed water until said polyisoprene solution is substantially free of inorganic residues.

7. The method as defined in claim 4 wherein the said reaction mixture contains a copolymer of a 1-monoolefin with isoprene.

8. The method as defined in claim 1 wherein the said reaction mixture is a slurry of solid polyethylene in a hydrocarbon solvent.

References Cited in the file of this patent

UNITED STATES PATENTS

| | | |
|---|---|---|
| 2,440,498 | Young et al. | Apr. 17, 1948 |
| 2,458,378 | Herbolsheimer | Jan. 4, 1949 |
| 2,560,164 | Garber | July 10, 1951 |
| 2,721,189 | Anderson et al. | Oct. 18, 1955 |